No. 896,358. PATENTED AUG. 18, 1908.
A. V. BRYCE.
LOCKING NUT.
APPLICATION FILED SEPT. 16, 1907.
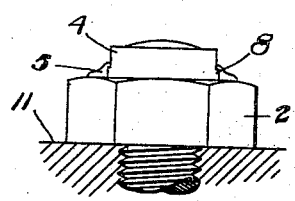
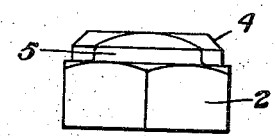
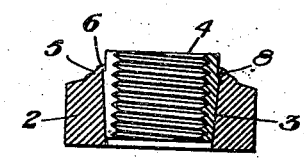
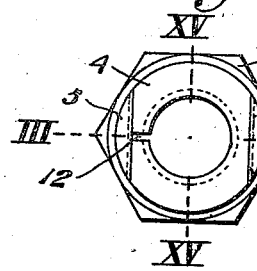
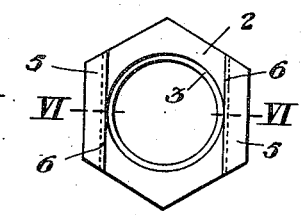
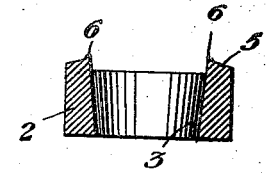
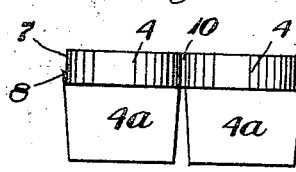
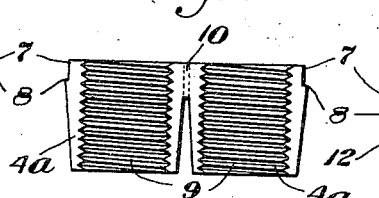
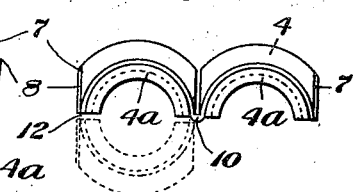
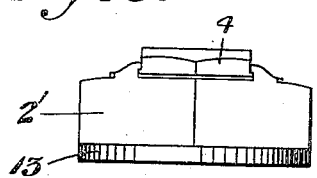
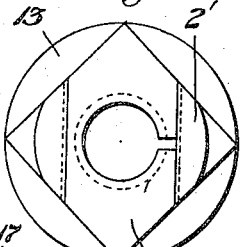
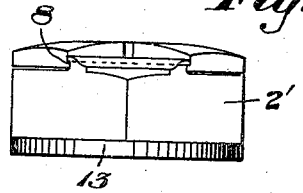
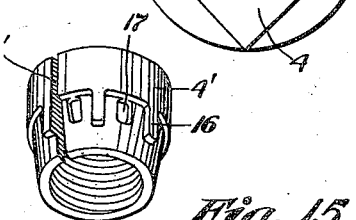
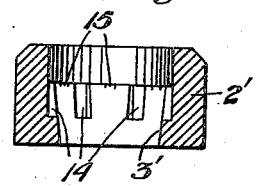
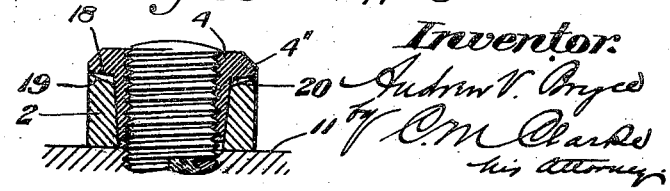
Witnesses:
E. R. Rodd.
Geo. S. Sipley.
Inventor:
Andrew V. Bryce
C. M. Clarke
his Attorney

UNITED STATES PATENT OFFICE.

ANDREW V. BRYCE, OF PITTSBURG, PENNSYLVANIA, ASSIGNOR TO INTER-STATE MANUFACTURING COMPANY, OF PITTSBURG, PENNSYLVANIA, A CORPORATION OF ARIZONA TERRITORY.

LOCKING-NUT.

No. 896,358.      Specification of Letters Patent.      Patented Aug. 18, 1908.

Application filed September 16, 1907. Serial No. 393,070.

*To all whom it may concern:*

Be it known that I, ANDREW V. BRYCE, a citizen of the United States, residing at Pittsburg, in the county of Allegheny and State of Pennsylvania, have invented certain new and useful Improvements in Locking-Nuts, of which the following is a specification, reference being had therein to the accompanying drawing.

My invention consists of an improvement in locking nuts for bolts, etc. of that class wherein a turning nut is provided with an internal threaded bushing adapted to engage the bolt under turning action of the nut and to gradually tighten upon it so as to prevent its loosening.

The invention has for its object to provide a device of this character which shall be simple and efficient in construction, cheap to manufacture, so constructed that the nut and contained bushing may be assembled and maintained in operative relation to each other without separation during shipment or handling, and generally adapted to tightly hold a bolt without danger of loosening, as shall be more fully hereinafter described.

Referring to the drawings:—Figures 1 and 2 are views in side elevation of the device employing a hexagon nut. Fig. 3. is a vertical sectional view on the line III. III. of Fig. 4. Fig. 4. is a plan view of Fig. 1. Fig. 5. is a plan view of the nut, the bushing having been removed. Fig. 6. is a sectional view on the line VI. VI. of Fig. 5. Figs. 7 and 8 are exterior and interior plan views of the bushing blank. Fig. 9. is an end view of the bushing blank, its assembled form being indicated in dotted lines. Figs. 10 and 11 are views in side elevation of the device as used with a flanged nut. Fig. 12. is a plan view of said figures. Fig. 13. is a cross sectional view showing a modified construction of nut. Fig. 14. is a perspective detail view of the bushing of said nut, provided with engaging elements adapted to prevent rotation. Fig. 15. is a vertical sectional detail view on the line XV. XV. of Fig. 4, illustrating a modified construction.

Referring to the drawings, 2 is a turning nut of any suitable outside form, either square or hexagon, the interior of which is provided with concentric downwardly narrowing tapered walls 2 as shown in Fig. 6 adapted to receive the interior bushing 4 as shown in Fig. 3. The upper face of nut 2 is provided with upwardly extending lugs or lips 5 having thin terminal edges 6 adapted to engage the corresponding straight or flat edges 7 of the top portion of bushing 4 and to be bent over thereon to securely engage said bushing and positively prevent its disengagement from the nut 2, whereby the bushing and nut will thus constantly maintain their relative position. For the purpose of insuring holding engagement between lips 6 and the bushing, it is preferably provided with narrow laterally extending flanges or beads 8, over which the lips 6 may be readily forced, as clearly shown in the drawings.

In Figs. 7, 8 and 9 I illustrate my preferred form of bushing, for facility of manufacture, whereby the interior threads 9 may be cast, thus greatly cheapening the operation.

The bushing as shown is cast in two halves 4ª, 4ª, approximately semi-cylindrical as to their body portion and joined by a thin web of metal 10, the enlarged head of the bushing having the flat sides 7 as stated, so that when inserted in position in the nut it may be readily turned thereby, upon turning the nut with a wrench. The bushing blank shown in said figures is bent around upon itself, the connecting bridge 10 maintaining its integral connection or being fractured in the operation without effecting its assemblage with the nut, whereupon the bushing is inserted downwardly into the nut cavity as clearly shown in the drawings, particularly Fig. 3. It will be noted that the tapering annular exterior faces of the bushing correspond with the tapering annular exterior faces 3 of the nut, whereby a neat binding fit is insured.

In applying the device, the bushing is screwed downwardly upon a bolt as shown in Fig. 1 until the nut 2 binds against any meeting surface 11, as for instance the face of a fish bar in making a rail joint, and when the under face of nut 2 makes contact, further turning will cause the bushing to feed upon the bolt threads, tending to draw it inwardly within the tapered nut socket. The result of such operation is that the sides of the bushing will be forced together, owing to clearance space 12 between the meeting edges, until the nut has been turned to the desired tension, whereupon the bushing will firmly grasp the bolt, and at the same time hold the nut in its seated position.

As thus assembled the complete device will act as a nut, securely holding any parts together by means of the bolt, and disengagement or looseness will be absolutely prevented. Should for any reason the parts become loose they may be readily adjusted by merely turning the nut to take up wear.

In Figs. 10, 11 and 12 I have shown the nut 2' as provided at its bottom portion with an integral washer 13, adapting it for special use, as for axles, etc.

By reason of the construction of the device in either form, it will be noted that the nut may be screwed against a permanent bearing, or against a temporary abutment for the purpose of causing the binding action of the bushing upon the bolt, thus positively holding the nut in any desired position.

In Fig. 13 I have shown a special form of nut 2' having in its interior the tapered faces 3' with a series of recesses 14 and intervening inwardly extending thin lips 15. The bushing 4' for such form of nut is provided with corresponding tapered exterior faces and laterally projecting lugs 16 with intervening recesses 17, adapted to engage the recesses 14 and lips 15 respectively. The function of the recesses 14 and projections 16 is to prevent rotation of the bushing relative to the nut, and of the lips 15 and recesses 17 to cause binding action to prevent withdrawal of the bushing, thus insuring continued assemblage of the parts. The bushing is divided as indicated at 12' at one side to provide ample clearance for contraction.

In Fig. 15 I have further illustrated the interior construction of the device, in section, showing the bushing 4 inserted within the surrounding nut 2, the under sides of the lateral projections 4'' of the bushing being sloped somewhat downwardly as indicated at 18, while the corresponding upper faces of nut 2 are also sloped downwardly to a greater degree as indicated at 19. The resulting effect of such construction is that when the outer edges of the bushing flanges make contact with the outer edges of the nut 2, an inwardly widening space 20 is provided, giving clearance, so that the contacting edges of the bushing and nut forming a fulcrum bearing, the inwardly pinching or grasping effect of the bushing will be greatly increased, thus materially increasing its holding power.

With either form of construction the complete device constitutes a strong, efficient and durable locking nut having great strength and continuous holding power. It may be used in various adaptations and may be changed or varied in different details of construction or design or in other features by the skilled mechanic, but all such changes are to be considered as within the scope of the following claims.

What I claim is:—

1. A locking nut consisting of an outer nut having a continuous annular interior tapered cavity and oppositely located projecting parallel holding lugs having thin terminal edges at its outer end, and a divided bushing having corresponding annular exterior tapered faces and interior threads and opposite parallel holding faces at one end adapted to be engaged by said holding lugs, substantially as set forth.

2. A locking nut consisting of an outer nut having a continuous annular interior tapered cavity and oppositely located projecting parallel holding lugs having thin terminal edges at its outer end, and a divided bushing having corresponding annular exterior tapered faces and interior threads and opposite parallel shouldered holding faces at one end adapted to be engaged by said holding lugs when inserted and by said terminal edges when bent over into engagement, substantially as set forth.

3. The combination with an outer nut having a continuous annular tapered interior, parallel bearing lugs projecting beyond one end, and intervening lug-bearing edges extending across the opposite outer portions of the nut; of a tapered divided bushing having interior threads, corresponding annular exterior tapered faces, and oppositely arranged lugs at one end having parallel sides adapted to bear against the inner sides of the bearing lugs of the nut and upon said bearing edges, substantially as set forth.

4. In a locking nut, the combination of a nut having an inwardly and downwardly sloping upper face and a smooth tapered interior, and a divided bushing having laterally projecting flanges tapered inwardly and downwardly to a less degree and also having a smooth exterior and interior threads for engagement with the bolt, with means for assembling the nut and bushing to prevent relative rotation of either, substantially as set forth.

5. A bushing consisting of semi-cylindrical halves having smooth annular exterior faces and interior threads, joined at one end by a thin integral connecting bridge, and provided at the same end with flat turning shoulders, substantially as set forth.

6. A bushing consisting of semi-cylindrical cast metal halves having smooth annular exterior faces and interior threads, joined at one end by a thin integral connecting bridge and provided at the same end with oppositely arranged flat turning shoulders extending at each side of the connecting bridge and of the ends of the bushing respectively, substantially as set forth.

7. The combination of an outer nut having a continuous annular smooth tapered interior and oppositely arranged parallel projecting holding lugs and intervening oppositely arranged recesses at its outer end, and an internally threaded bushing consisting of semi-cylindrical exteriorly tapered halves having parallel outer bearing faces and oppositely projecting lugs at their outer ends adapted to engage the holding lugs of the nut and to occupy said recesses, substantially as set forth.

In testimony whereof I affix my signature in presence of two witnesses.

ANDREW V. BRYCE.

Witnesses:
    GEO. B. BLEMING,
    C. M. CLARKE.